US012003957B2

(12) United States Patent
Stauffer et al.

(10) Patent No.: US 12,003,957 B2
(45) Date of Patent: Jun. 4, 2024

(54) DISTRIBUTED NETWORK CELLULAR IDENTITY MANAGEMENT (71) Applicant: Google LLC, Mountain View, CA (US)

(72) Inventors: Erik Richard Stauffer, Sunnyvale, CA (US); Jibing Wang, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 191 days.

(21) Appl. No.: 17/281,207

(22) PCT Filed: Sep. 30, 2019

(86) PCT No.: PCT/US2019/053861
§ 371 (c)(1),
(2) Date: Mar. 29, 2021

(87) PCT Pub. No.: WO2020/072376
PCT Pub. Date: Apr. 9, 2020

(65) Prior Publication Data
US 2021/0400474 A1 Dec. 23, 2021

Related U.S. Application Data (60) Provisional application No. 62/741,079, filed on Oct. 4, 2018.

(51) Int. Cl.
*H04W 12/041* (2021.01)
*H04L 9/06* (2006.01)
(Continued)

(52) U.S. Cl.
CPC ......... *H04W 12/041* (2021.01); *H04L 9/0618* (2013.01); *H04L 9/0825* (2013.01); *H04W 12/06* (2013.01)

(58) Field of Classification Search
CPC ....... H04L 9/0618; H04L 9/0825; H04L 9/50; H04L 2209/80; H04L 9/3239;
(Continued)

(56) References Cited

U.S. PATENT DOCUMENTS

2010/0111307 A1* 5/2010 Hu ................. H04L 9/3271
380/277
2011/0314287 A1 12/2011 Escott et al.
(Continued)

FOREIGN PATENT DOCUMENTS

CN 102026178 4/2011
JP 2015502104 1/2015
(Continued)

OTHER PUBLICATIONS

"Foreign Office Action", EP Application No. 19794285.7, Oct. 30, 2020, 9 pages.
(Continued)

*Primary Examiner* — Carl G Colin
*Assistant Examiner* — Andrew Suh
(74) *Attorney, Agent, or Firm* — PATENT PORTFOLIO BUILDERS PLLC (57) ABSTRACT This document describes techniques and apparatuses for distributed network cellular identity management. In particular, a distributed-network cellular-identity-management (DNCIM) server includes a lookup table that stores and relates together a user-equipment (UE) public key associated with a UE private key, a core-network (CN) public key associated with a CN private key, and a subscriber identity. Using the DNCIM server, the UE and an authentication server respectively generate two different (e.g., asymmetric) cipher keys based on the UE private key and the CN public key, and the UE public key and the CN private key. The UE and the authentication server can also authenticate one
(Continued)

another by referencing information in the lookup table of the DNCIM server. Using these cipher keys, the UE and the authentication server can establish secure communications with each other.

9 Claims, 6 Drawing Sheets

(51) Int. Cl.
*H04L 9/08* (2006.01)
*H04W 12/06* (2021.01)

(58) Field of Classification Search
CPC .............. H04L 9/3271; H04L 63/0442; H04L 63/0869; H04L 63/0428; H04W 12/041; H04W 12/06
See application file for complete search history.

(56) References Cited

U.S. PATENT DOCUMENTS

| | | | |
|---|---|---|---|
| 2014/0146966 A1 | 5/2014 | Bieber | |
| 2014/0258723 A1 | 9/2014 | Zhang | |
| 2015/0341791 A1* | 11/2015 | Yang | G06F 21/33 713/159 |
| 2016/0249215 A1* | 8/2016 | Morita | H04L 63/0884 |
| 2017/0280328 A1 | 9/2017 | Yang et al. | |
| 2018/0199193 A1 | 7/2018 | Lee et al. | |
| 2018/0367535 A1* | 12/2018 | Liao | H04W 76/10 |
| 2019/0058697 A1 | 2/2019 | Chang et al. | |
| 2019/0090132 A1* | 3/2019 | Li | H04L 63/0823 |
| 2019/0238322 A1* | 8/2019 | Wang | H04L 63/126 |
| 2019/0342854 A1* | 11/2019 | Rune | H04W 68/02 |
| 2019/0394640 A1* | 12/2019 | Lee | H04W 8/04 |
| 2020/0084028 A1* | 3/2020 | Wang | H04L 63/0442 |

FOREIGN PATENT DOCUMENTS

| | | |
|---|---|---|
| JP | 2017520953 | 7/2017 |
| JP | 2018152783 | 9/2018 |
| WO | 2017188895 | 11/2017 |
| WO | 2019104690 | 6/2019 |
| WO | 2019183794 | 10/2019 |
| WO | 2020072376 | 4/2020 |

OTHER PUBLICATIONS

"International Search Report and Written Opinion", PCT Application No. PCT/US2019/053861, Dec. 12, 2019.
"Foreign Office Action", JP Application No. 2021-517354, Jul. 12, 2022, 6 pages.
"International Preliminary Report on Patentability", Application No. PCT/US2019/053861, Mar. 23, 2021, 11 pages.
"Foreign Office Action", IN Application No. 202147014925, Feb. 4, 2022, 7 pages.
"Summons to Attend Oral Proceedings", EP Application No. 19794285.7, Dec. 23, 2021, 10 pages.
Office Action in corresponding/related Chinese Patent Application No. 201980063425.8 dated Sep. 8, 2023.

* cited by examiner

DISTRIBUTED NETWORK CELLULAR IDENTITY MANAGEMENT

RELATED APPLICATION(S)

This application is a national stage entry of International Application No. PCT/US2019/053861, filed Sep. 30, 2019, which claims the benefit of U.S. Provisional Application No. 62/741,079, filed Oct. 4, 2018, the disclosures which are incorporated herein by reference in their entirety.

BACKGROUND

Some electronic devices can use radio-frequency (RF) signals to communicate information. These radio-frequency signals enable users to talk with friends, download information, share pictures, remotely control household devices, receive global positioning information, listen to radio stations, and so forth. It can be challenging to protect the information carried by the radio-frequency signals from a third party. Because the radio-frequency signals propagate through air, the third party can use equipment to detect these radio-frequency signals. Without appropriate security measures, the third party can extract information from the radio-frequency signals and use this information to impersonate the user, gain unauthorized access to the network, eavesdrop on a conversation, invade a user's privacy, perform disruptive or illegal acts under the user's identity, and so forth.

To address this issue, wireless communications can use cryptography to encrypt the information that is carried by the radio-frequency signals. This encryption can make it challenging for the third party to extract the information. Some wireless communication standards use symmetric keys, which are provided to a user equipment (UE) and a network to enable the UE and the network to encrypt or decrypt information that is communicated between them. The use of symmetric keys, however, has some inherent vulnerabilities. For example, an entity responsible for assigning a symmetric key to a UE can unintentionally or intentionally distribute the symmetric key to the third party. Additionally, a server responsible for storing the symmetric key of the network can be vulnerable to a cyberattack (e.g., hacking) from the third party. Consequently, it can be challenging to secure symmetric keys that are stored in separate locations.

SUMMARY

Techniques and apparatuses are described for distributed network cellular identity management. In particular, a distributed-network cellular-identity-management (DNCIM) server includes a lookup table with one or more entries associated with different user equipment (UE). Each entry includes a UE public key, a core network (CN) public key, and a subscriber identifier associated with the particular UE. The UE and an authentication server of a network generate respective cipher keys based on a UE private key and the CN public key, and the UE public key and a CN private key. These cipher keys are asymmetric keys that can be used for establishing secure communications (e.g., encrypting and decrypting messages between the UE and the network). The UE and the authentication server can also authenticate one another by e.g. determining if the subscriber identifier stored in the DNCIM server corresponds with the CN public key and the UE public key used by the UE and the authentication server, respectively. With the DNCIM server, a single symmetric key does not need to be securely placed in two locations. Instead, the UE and the authentication server can generate different cipher keys based on information stored and related together by the DNCIM server.

Aspects described below include a method performed by an authentication server. The method includes storing a core-network public key, a core-network private key associated with the core-network public key, and an expected payload. The method also includes receiving a user-equipment public key associated with a user equipment and generating a first cipher key based on both the user-equipment public key and the core-network private key. The method additionally includes receiving an encrypted message from the user equipment. The encrypted message includes a payload encrypted with a second cipher key that is based on a user-equipment private key and the core-network public key. The method further includes decrypting the encrypted message using the first cipher key to obtain the payload and verifying the first cipher key and the second cipher key based on a determination that the payload of the encrypted message is equal to the expected payload.

Aspects described below include an authentication server with a first processor and first memory system configured to perform any of the methods described. The processor may be communicatively coupled to the first memory system, wherein the processor may be configured to execute computer-readable instructions that are stored in the first memory system and that cause the authentication server to carry out the steps of any of the methods described and/or claimed.

Aspects described below also include a method performed by a user equipment. The method includes storing, by an integrated circuit of the user equipment, a user-equipment private key and a first subscriber identity. The user-equipment private key is associated with a user-equipment public key. The method also includes obtaining a core-network public key associated with an authentication server and generating a first cipher key based on the user-equipment private key and the core-network public key. The method additionally includes sending an encrypted message to the authentication server. The encrypted message includes a payload encrypted with the first cipher key. The method further includes sending the core-network public key to a distributed-network cellular-identity-management server and receiving a second subscriber identity that corresponds to the core-network public key from the distributed-network cellular-identity-management server. The method includes authenticating the authentication server based on a determination that the second subscriber identity provided by the distributed-network cellular-identity-management server is equal to the first subscriber identity stored by the integrated circuit.

Aspects described below include a user equipment with a radio-frequency transceiver. The user equipment also includes a processor and memory system configured to perform any of the methods described. The processor may be communicatively coupled to the memory system, wherein the processor may be configured to execute computer-readable instructions that are stored in the memory system and that cause the authentication server to carry out the steps of any of the methods described and/or claimed. Further, the invention relates to a system comprising an authentication server and a user equipment.

Aspects described below also include a system with means for establishing secure communications between a core network and a user equipment using distributed network cellular identity management.

BRIEF DESCRIPTION OF THE DRAWINGS

Apparatuses of and techniques for distributed network cellular identity management are described with reference to the following drawings. The same numbers are used throughout the drawings to reference like features and components.

DETAILED DESCRIPTION

Overview

This document describes techniques and devices for distributed network cellular identity management. Without appropriate security measures, information carried by radio-frequency signals can be intercepted by a third party. To address this issue, wireless communications can use cryptography to encrypt the information that is carried by the radio-frequency signals. This encryption can make it challenging for the third party to extract the information.

Some wireless communication standards use symmetric keys, which are provided to a user equipment (UE) and a network to enable the UE and the network to encrypt or decrypt information that is communicated between them. The use of symmetric keys, however, has some inherent vulnerabilities. For example, an entity responsible for assigning a symmetric key to a UE can unintentionally or intentionally distribute the symmetric key to the third party. Additionally or alternatively, a server responsible for storing the symmetric key of the network can be subject to a cyberattack (e.g., hacking) from the third party.

To address these vulnerabilities, techniques and apparatuses are described for distributed network cellular identity management. In particular, a distributed-network cellular-identity-management (DNCIM) server includes a lookup table with one or more entries associated with different user equipment (UE). Each entry includes a UE public key, a core network (CN) public key, and a subscriber identifier associated with the particular UE. The UE and an authentication server of a network generate respective cipher keys based on a UE private key and the CN public key, and the UE public key and a CN private key. These cipher keys are asymmetric keys that can be used for establishing secure communications (e.g., encrypting and decrypting messages between the UE and the network). The UE and the authentication server can also authenticate one another by determining if the subscriber identifier stored in the DNCIM server corresponds with the CN public key and the UE public key used by the UE and the authentication server, respectively. With the DNCIM server, a single symmetric key does not need to be securely placed in two locations. Instead, the UE and the authentication server can generate different cipher keys based on information stored and related together by the DNCIM server.

Example Environment

Figure 1:
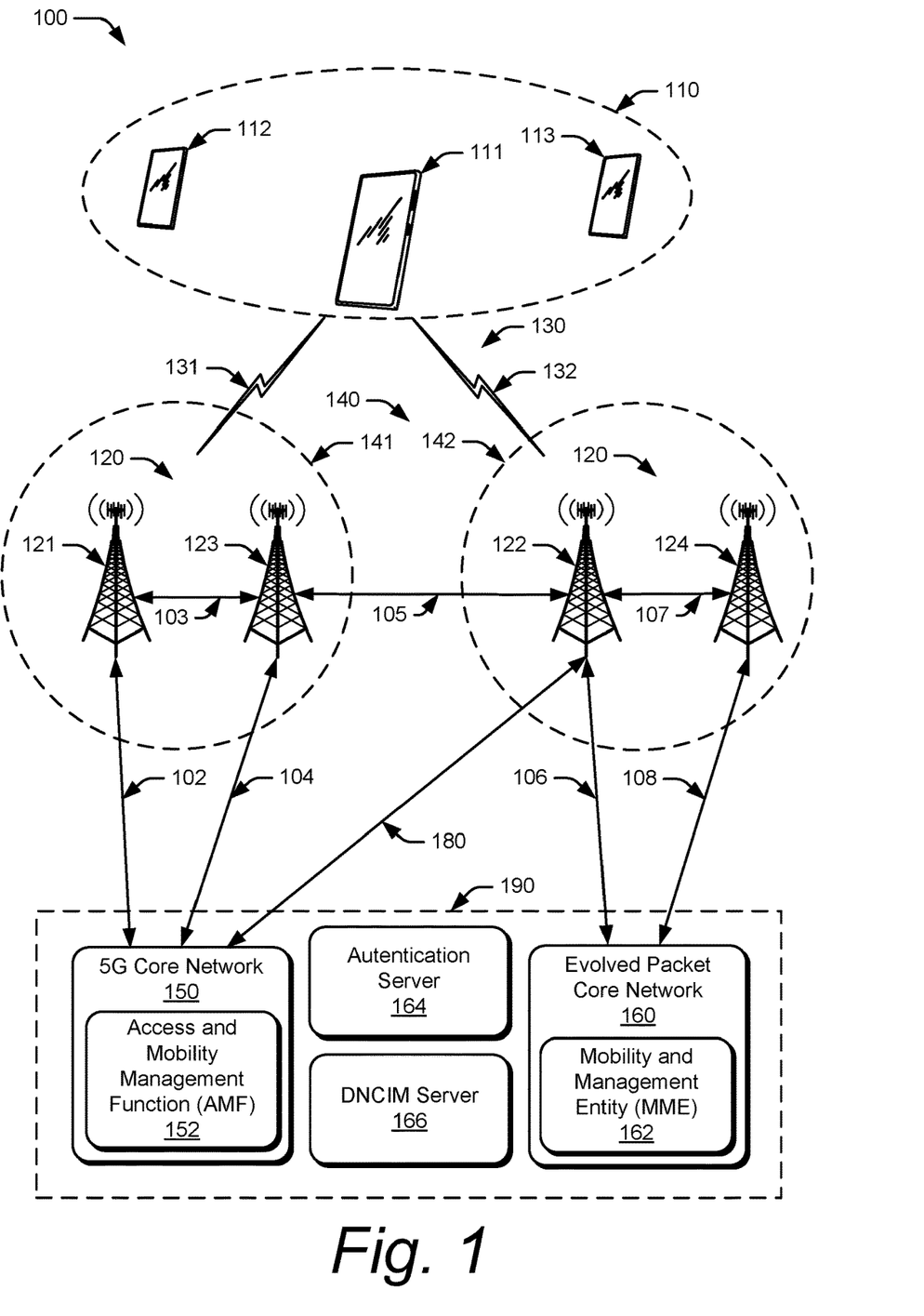
FIG. 1 illustrates an example wireless network environment in which distributed network cellular identity management can be implemented.

FIG. 1 illustrates an example environment 100, which includes multiple user equipment 110 (UE 110), illustrated as UE 111, UE 112, and UE 113. Each UE 110 can communicate with base stations 120 (illustrated as base stations 121, 122, 123, and 124) through one or more wireless communication links 130 (wireless link 130), illustrated as wireless links 131 and 132. For simplicity, the UE 110 is implemented as a smartphone but may be implemented as any suitable computing or electronic device, such as a mobile communication device, modem, cellular phone, gaming device, navigation device, media device, laptop computer, desktop computer, tablet computer, smart appliance, vehicle-based communication system, or an Internet-of-Things (IoT) device such as a sensor or an actuator. The base stations 120 (e.g., an Evolved Universal Terrestrial Radio Access Network Node B, E-UTRAN Node B, evolved Node B, eNodeB, eNB, Next Generation Evolved Node B, ng-eNB, Next Generation Node B, gNode B, gNB, or the like) may be implemented in a macrocell, microcell, small cell, picocell, or the like, or any combination thereof.

The base stations 120 communicate with the UE 110 using the wireless links 131 and 132, which may be implemented as any suitable type of wireless link. The wireless links 131 and 132 include control and data communication, such as downlink of data and control information communicated from the base stations 120 to the UE 110, uplink of other data and control information communicated from the UE 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), Enhanced Long-Term Evolution (eLTE), Fifth-Generation New Radio (5G NR), Fourth-Generation (4G) standard, and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110.

The base stations 120 are collectively a Radio Access Network 140 (e.g., RAN, Evolved Universal Terrestrial Radio Access Network, E-UTRAN, 5G NR RAN or NR RAN). The RANs 140 are illustrated as an NR RAN 141 and an E-UTRAN 142. In FIG. 1, core network 190 is shown to include a Fifth-Generation Core (5GC) network 150 (5GC 150) and an Evolved Packet Core (EPC) network 160 (EPC 160), which are different types of core networks. The base stations 121 and 123 in the NR RAN 141 are connected to the 5GC 150. The base stations 122 and 124 in the E-UTRAN 142 are connected to the EPC 160. Optionally or additionally, the base station 122 may connect to both the 5GC 150 and EPC 160 networks.

The base stations 121 and 123 connect, at 102 and 104 respectively, to the 5GC 150 through an NG2 interface for control-plane signaling and using an NG3 interface for user-plane data communications. The base stations 122 and 124 connect, at 106 and 108 respectively, to the EPC 160 using an Si interface for control-plane signaling and user-plane data communications. Optionally or additionally, if the base station 122 connects to the 5GC 150 and EPC 160 networks, the base station 122 connects to the 5GC 150 using an NG2 interface for control-plane signaling and through an NG3 interface for user-plane data communications, at 180.

In addition to connections to core networks 190, the base stations 120 may communicate with each other. For example, the base stations 121 and 123 communicate through an Xn interface at 105, the base stations 122 and 123 communicate through an Xn interface at 105, and the base stations 122 and 124 communicate through an X2 interface at 107.

The 5GC 150 includes an Access and Mobility Management Function 152 (AMF 152), which provides control-plane functions, such as registration and authentication of multiple UE 110, authorization, and mobility management in the 5G NR network. The EPC 160 includes a Mobility Management Entity 162 (MME 162), which provides control-plane functions, such as registration and authentication of multiple UE 110, authorization, or mobility management in the E-UTRA network. The AMF 152 and the MME 162 communicate with the base stations 120 in the RANs 140 and also communicate with multiple UE 110, using the base stations 120.

The core network 190 also includes an authentication server 164 and a distributed-network cellular-identity-management (DNCIM) server 166. The authentication server 164 can participate in an authentication and key agreement procedure with the multiple UE 110 to authenticate the multiple UE 110 and generate cipher keys to enable secure communications with the multiple UE 110. Generally, the authentication server 164 can communicate with the AMF 152 or the MME 162 or can access information and functions of the AMF 152 or the MME 162. In 4G wireless communication standards, the authentication server 164 can be implemented as a home subscriber server (HSS). In 5G wireless communication standards, the authentication server 164 can include an authentication server function (AUSF) or a unified data management (UDM) module. The DNCIM server 166 can generate, distribute, or store public keys of the multiple UE 110 and the core network 190 for distributed network cellular identity management. The UE 110, the authentication server 164, and the DNCIM server 166 are further described with respect to FIG. 2.

Figure 2:
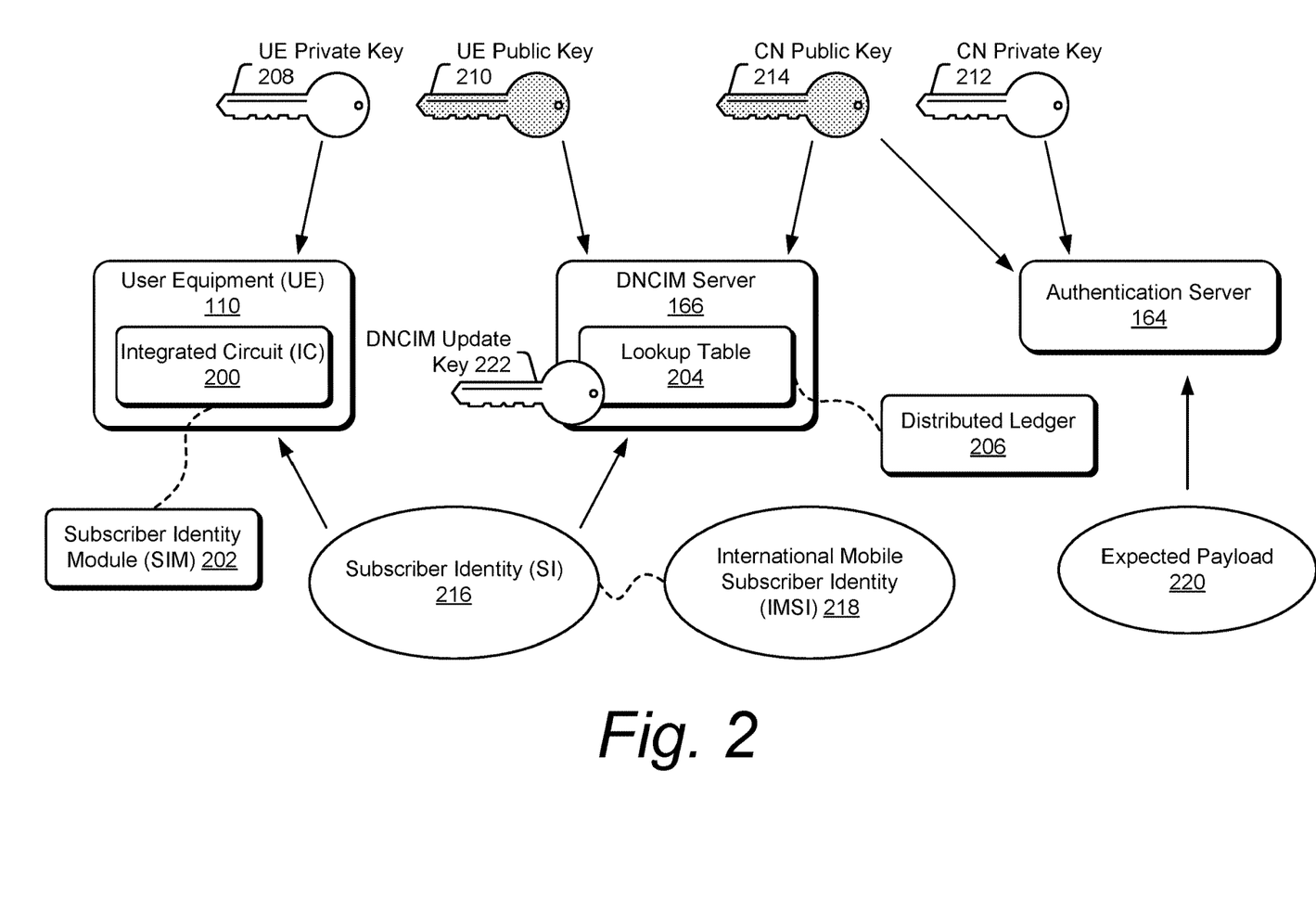
FIG. 2 illustrates example entities for distributed network cellular identity management.

FIG. 2 illustrates example entities for distributed network cellular identity management. These entities include the UE 110, the authentication server 164, and the DNCIM server 166. In the depicted configuration, the UE 110 includes an integrated circuit (IC) 200, which can be implemented as a subscriber identity module (SIM) 202 (e.g., a SIM card). The integrated circuit 200 can securely store information to identify and authenticate a network subscriber (e.g., a user of the UE 110).

The DNCIM server 166 includes a lookup table 204. The lookup table 204 contains public information associated with the UE 110 and the core network 190, as further described below. In some aspects, the DNCIM server 166 is implemented using multiple public or private entities (e.g., multiple servers or multiple databases) and the lookup table 204 is implemented as a distributed ledger 206. In this manner, the lookup table 204 can be maintained, updated, and secured using techniques such as blockchain. In general, the information stored in the lookup table 204 is public information, which can be obtained by any entity able to communicate with DNCIM server 166.

A network provider generates two pairs of cryptographic keys (e.g., numbers). Each pair of cryptographic keys includes a private key and a public key, which are mathematically linked and differ from one another. A variety of different mathematical operations can be used to relate the private key and the public key together, including factorization or discrete logarithms. In general, it is relatively easy (e.g., computationally efficient) to generate the public key given the private key. However, it is challenging (e.g., computationally inefficient) to derive the private key from the public key. As such, the public key can be distributed and shared with other entities without exposing the private key. Due to the mathematical relationship between the public key and the private key, messages encrypted with the public key can be decrypted using the private key.

As shown in FIG. 2, the network provider generates a UE private key 208, a UE public key 210, a core network (CN) private key 212, and a CN public key 214. The UE private key 208 and the UE public key 210 are a pair of asymmetric cryptographic keys, and the CN private key 212 and the CN public 214 are a second pair of asymmetric cryptographic keys. The network provider can employ a variety of different types of asymmetric key generation algorithms to generate these pairs of cryptographic keys, including a Rivest-Shamir-Adleman (RSA) algorithm, elliptic curve cryptography (ECC), and so forth.

The network provider passes the UE private key 208 and the CN private key 212 to the UE 110 and the authentication server 164, respectively. Within the UE 110, the integrated circuit 200 (e.g., the SIM 202) can securely store the UE private key 208. The network provider also assigns a subscriber identity 216 of the network subscriber to the UE 110. The subscriber identity 216 can be used by the authentication server 164 or other network entities to uniquely identify the network subscriber. As an example, the subscriber identity 216 can be an international mobile subscriber identity (IMSI) 218 that is securely stored by the SIM 202. Although not explicitly shown, the UE 110 can also store the UE public key 210 or the CN public key 214. These public keys 210 and 214 can be stored by the integrated circuit 200 or a computer-readable storage media (CRM) (e.g., CRM 312 of FIG. 3).

In some aspects, the network provides the authentication server 164 the CN public key 214. In other aspects, the authentication server 164 can obtain the CN public key 214 from the DNCIM server 166. The authentication server 164 can also store an expected payload 220, which can include the CN public key 214, a nonce (e.g., an arbitrary number), or some predetermined number. The expected payload 220 can be specified by the network provider.

The network provider also passes the UE public key 210, the CN public key 214, and the subscriber identity 216 to the DNCIM server 166. The DNCIM server 166 stores this information in an entry of the lookup table 204. With this entry, the DNCIM server 166 can relate the UE public key 210, the CN public key 214, and the subscriber identity 216 together. In some aspects, the DNCIM server 166 can lock or prevent changes to the entry within the lookup table 204 using a cryptographic hash based on a cryptographic key stored in the DNCIM server 166 (e.g., a DNCIM update key 222). The DNCIM server 166 can also make updates to the lookup table 204 by adding new entries or replacing the UE public key 210 or the CN public key 214 of the entry with a new UE public key or a new CN public key, respectively. The lookup table 204 can also include multiple entries associated with different UEs 110. In this manner, the DNCIM server 166 can provide at least one of the UE public key 210, the CN public key 214, or the subscriber identity 216 associated with an entry of the multiple entries responsive to receiving the UE public key 210, the CN public key 214, or the subscriber identity 216 corresponding to the entry.

Example Devices

Figure 3:
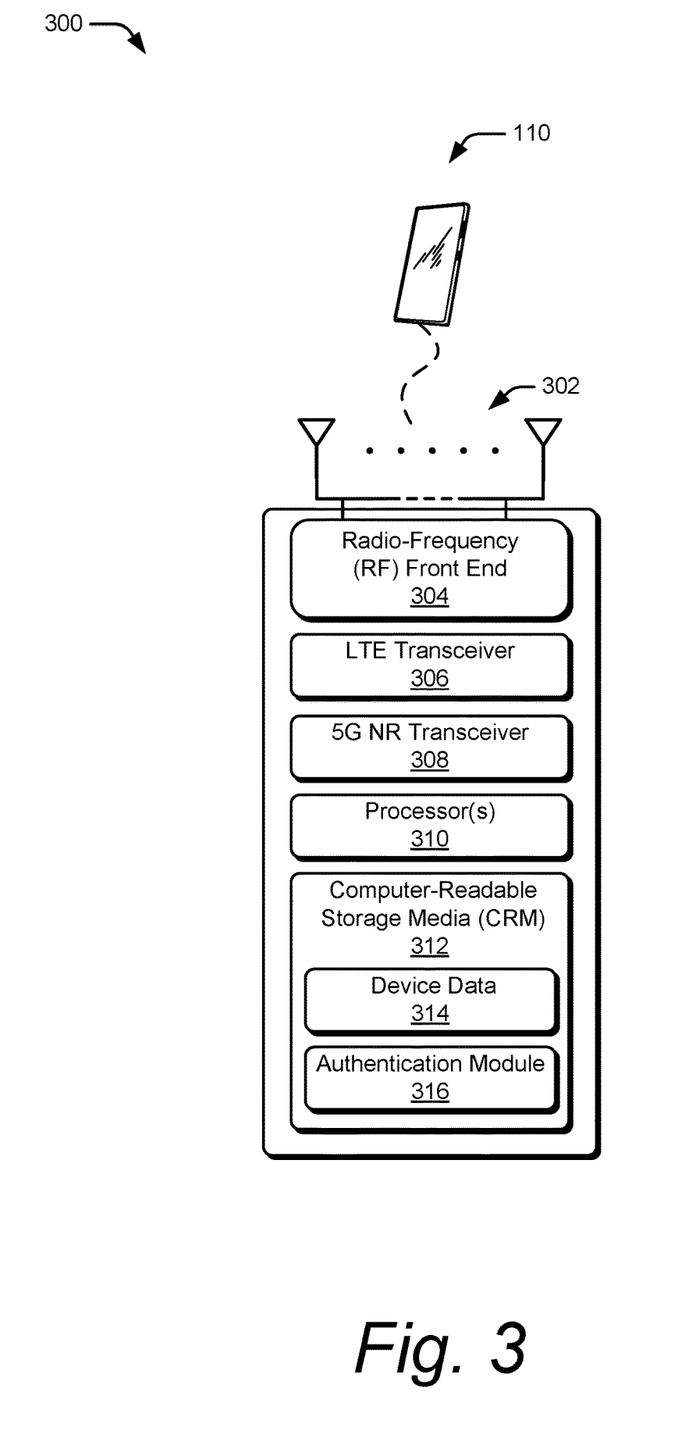
FIG. 3 illustrates an example device diagram of a user equipment for distributed network cellular identity management.

FIG. 3 illustrates an example device diagram 300 of the UE 110. The UE 110 may include additional functions and interfaces that are omitted from FIG. 3 for the sake of clarity. The UE 110 includes antennas 302, a radio-frequency (RF) front end 304 (RF front end 304), an LTE transceiver 306, and a 5G NR transceiver 308 for communicating with base stations 120 in the 5G RAN 141 and/or the E-UTRAN 142. The RF front end 304 of the UE 110 can couple or connect the LTE transceiver 306 and the 5G NR transceiver 308 to the antennas 302 to facilitate various types of wireless communication. The antennas 302 of the UE 110 may include an array of multiple antennas that are configured similarly to or differently from each other. The antennas 302 and the RF front end 304 can be tuned to, and/or be tunable to, one or more frequency bands defined by the 3GPP LTE and 5G NR communication standards and implemented by the LTE transceiver 306, and/or the 5G NR transceiver 308. By way of example and not limitation, the antennas 302 and the RF front end 304 can be implemented for operation in sub-gigahertz bands, sub-6 GHZ bands, and/or bands with frequencies between approximately 6 and 300 GHz that are defined by the 3GPP LTE and 5G NR communication standards.

The UE 110 also includes processor(s) 310 and computer-readable storage media 312 (CRM 312). The processor 310 may be a single-core processor or a multi-core processor composed of a variety of materials, such as silicon, poly-silicon, high-K dielectric, copper, and so on. The computer-readable storage media described herein excludes propagating signals. CRM 312 may include any suitable memory or storage device such as random-access memory (RAM), static RAM (SRAM), dynamic RAM (DRAM), non-volatile RAM (NVRAM), read-only memory (ROM), or Flash memory useable to store device data 314 of the UE 110. The device data 314 includes user data, multimedia data, beamforming codebooks, applications, and/or an operating system of the UE 110, which are executable by processor(s) 310 to enable user-plane communication, control-plane signaling, and user interaction with the UE 110.

CRM 312 also includes an authentication module 316. Alternatively or additionally, the authentication module 316 may be implemented in whole or part as hardware logic or circuitry integrated with or separate from other components of the UE 110. In at least some aspects, the authentication module 316 participates in the authentication and key agreement process with the authentication server 164, which is further described with respect to FIG. 4. During this process, the authentication module 316 generates a cipher key, which can enable the authentication module 316 to establish secure communications with the network. In particular, the authentication module 316 can use the cipher key to encrypt information that is sent to the base station 120 or decrypt information that is received from the base station 120. The UE 110, the authentication server 164, and the DNCIM server 166 can at least partially implement distributed network cellular identity management, as further described with respect to FIG. 4.

Distributed Network Cellular Identity Management

Figure 4:
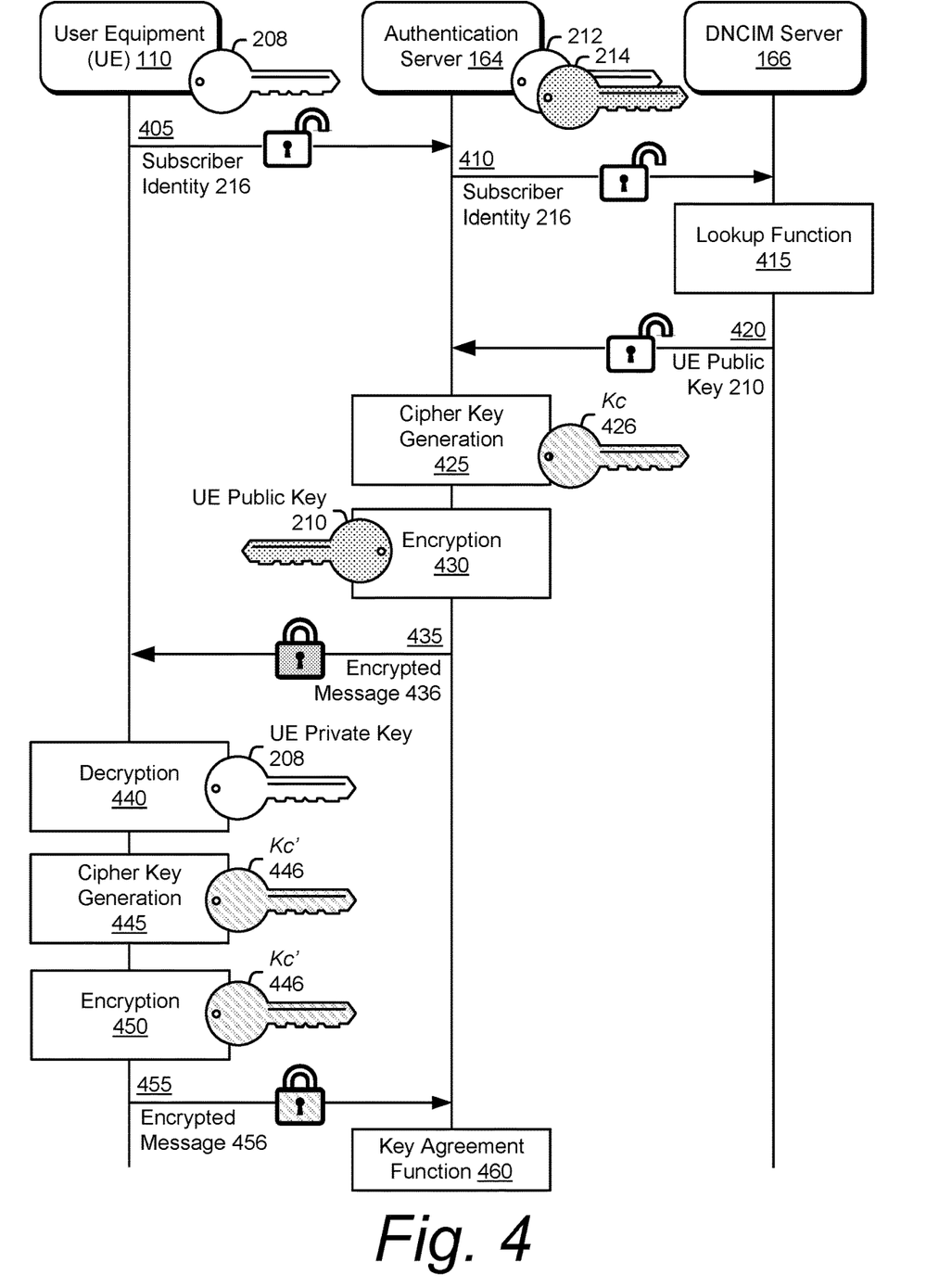
FIG. 4 illustrates details of example messaging transactions between entities for distributed network cellular identity management.

FIG. 4 illustrates details of example messaging transactions between entities for distributed network cellular identity management. In FIG. 4, a closed lock symbol and an open lock symbol respectively indicate if a message is communicated over a secure channel or an unsecured channel (e.g., whether the message is encrypted or not encrypted).

At 405, the authentication module 316 of the UE 110 directs the UE 110 to send the subscriber identity 216 (e.g., the IMSI 218) to the authentication server 164 of the core network 190. For example, the authentication module 316 can obtain the subscriber identity 216 from the SIM 202 and direct the LTE transceiver 306 or the 5G NR transceiver 308 to transmit, using the RF front end 304 and the antennas 302, a message that contains the subscriber identity 216. The authentication server 164 can receive the subscriber identity 216 from the base station 120.

At 410, the authentication server 164 forwards the subscriber identity 216 to the DNCIM server 166. The DNCIM server 166 provides the subscriber identity 216 as an input to a lookup function 415. The lookup function 415 uses the lookup table 204 to determine the UE public key 210 associated with the subscriber identity 216.

At 420, the DNCIM server 166 sends the corresponding UE public key 210 to the authentication server 164. If the authentication server 164 does not have the CN public key 214, the authentication server 164 can also request that the DNCIM server 166 sends the CN public key 214 associated with the subscriber identity 216 and the DNCIM 166 can respond by sending the CN public key 214 (not shown). In other aspects, the steps described at 410, 415, and 420 can be bypassed if the UE 110 sends the UE public key 210 to the authentication server 164 at 405. With the UE public key 210, the authentication server 164 can proceed to cipher key generation 425 and encryption 430, which are further described below.

Responsive to receiving the UE public key 210, the authentication server 164 performs cipher key generation at 425 and encryption at 430. At 425, the authentication server 164 generates a cipher key Kc 426 based on the UE public key 210 and the CN private key 212. The cipher key Kc 426 can be used to verify a UE 110's cipher key, as further described below.

At 430, the authentication server 164 generates an encrypted message 436 whose payload (e.g., contents) is encrypted using the UE public key 210. The payload of the encrypted message 436 includes the CN public key 214. In some aspects, the payload also includes a nonce or some predetermined number. At 435, the authentication server 164 sends the encrypted message 436 to the UE 110 using the base station 120.

Responsive to receiving the encrypted message 436, the authentication module 316 performs decryption at 440, cipher key generation at 445, and encryption at 450. At 440, the authentication module 316 decrypts the encrypted message 436 using the UE private key 208 to identify the CN public key 214 in the payload of the received encrypted message 436. In other aspects, the CN public key 214 can be pre-loaded and stored by the UE 110. As an example, the integrated circuit 200 or the CRM 312 can store the CN public key 214.

At 445, the authentication module 316 generates a cipher key Kc' 446 using both the UE private key 208 and the CN public key 214.

At 450, the authentication module 316 generates an encrypted message 456 whose payload is encrypted using the cipher key Kc' 446. The payload of the encrypted message 456 can include part or all of the content of the received encrypted message 436 (e.g., the CN public key 214 and/or the nonce), a second nonce, the UE public key 210, or a predetermined number.

At 455, the authentication module 316 directs the UE 110 to send the encrypted message 456 to the authentication server 164.

At 460, the authentication server 164 performs a key agreement function 460 to verify the cipher key Kc' 446 and the cipher key Kc 426. For example, the authentication server 164 decrypts the encrypted message 456 using the cipher key Kc 426 to obtain (e.g., extract) the payload of the encrypted message 456. If the payload matches the expected payload 220, which is stored by the authentication server 164, the authentication server 164 determines that the cipher key 446 of the UE 110 agrees with the cipher key 426 of the core network 190. In other words, the cipher keys 426 and 446 can be used to establish secure communications between the network and the UE 110. Responsive to verifying the cipher keys 426 and 446, the authentication module 316 and the authentication server 164 can authenticate each other, as further described with respect to FIG. 5.

Figure 5:
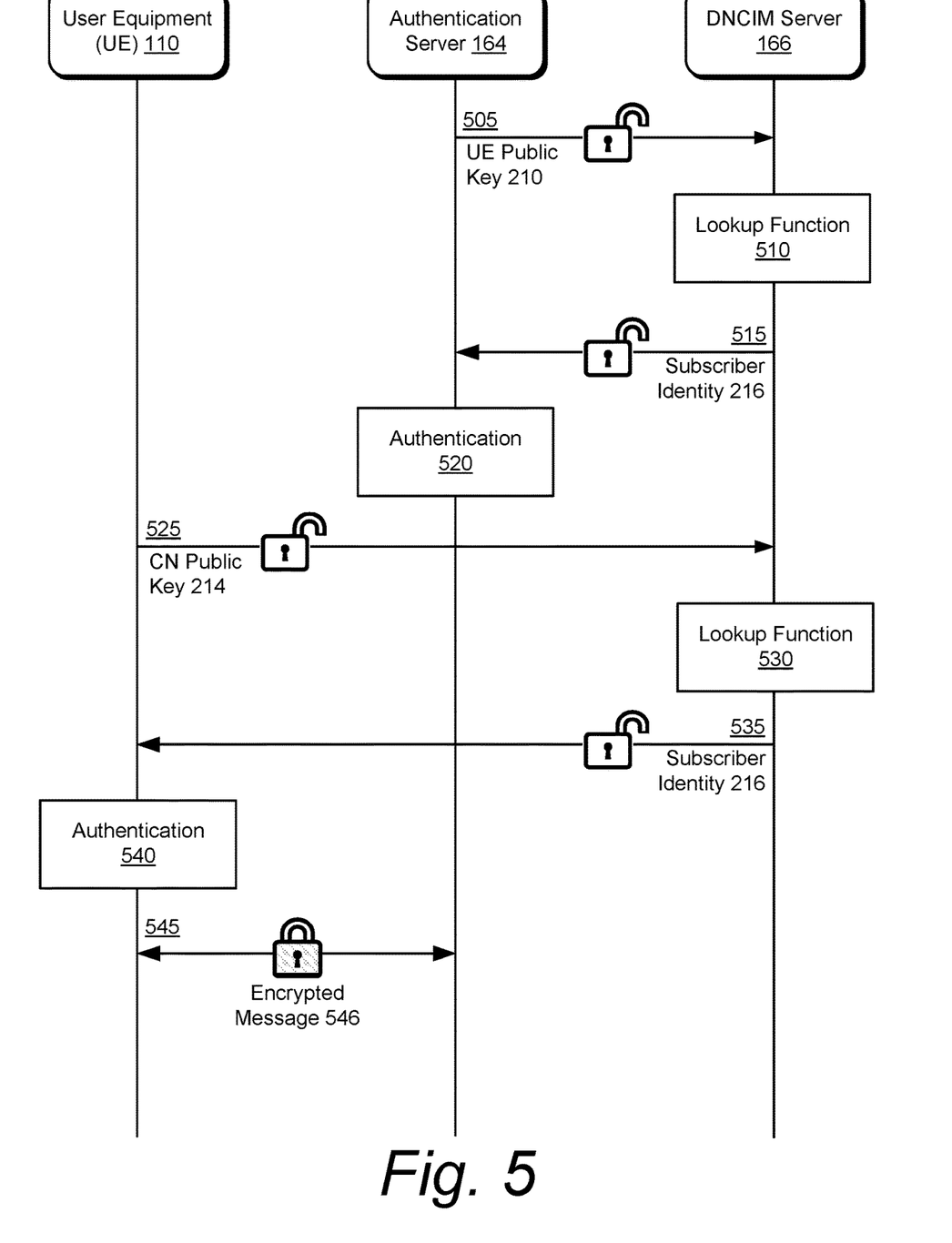
FIG. 5 illustrates additional details of example messaging transactions between entities for distributed network cellular identity management.

FIG. 5 illustrates additional details of example messaging transactions between entities for distributed network cellular identity management. At 505, the authentication server 164 sends the UE public key 210 to the DNCIM server 166.

At 510, the DNCIM server 166 uses a lookup function to determine the subscriber identity 216 associated with the UE public key 210.

At 515, the DNCIM server 166 sends the subscriber identity 216 to the authentication server 164. Responsive to receiving the subscriber identity 216, the authentication server 164 performs authentication at 520 to determine whether the previous subscriber identity 216 obtained at 405 in FIG. 4 is equal to the subscriber identity 216 obtained at 515. If these identities match, the authentication server 164 can establish secure communications with the UE 110 using the cipher key Kc 426. In other words, the DNCIM server 166 provides further information to reduce the risk of a successful spoof attack (or impersonation) of the UE 110 through using a false subscriber identity.

At 525, the authentication module 316 sends the CN public key 214, which was decrypted and extracted from the encrypted message 436 at 440 in FIG. 4, to the DNCIM server 166.

At 530, the DNCIM server 166 uses the lookup function to determine the subscriber identity 216 corresponding to the CN public key 214.

At 535, the DNCIM server 166 sends the subscriber identity 216 to the UE 110.

At 540, the authentication module 316 performs authentication to determine whether the subscriber identity 216 provided by the DNCIM server 166 is equal to the subscriber identity 216 stored in the integrated circuit 200 (e.g., the SIM 202). If these identities match, the authentication server 164 is authenticated, and the UE 110 can establish secure communications with the authentication server 164 using the cipher key Kc' 446.

At 545, the UE 110 and the core network 190 communicate together using one or more encrypted messages 546. For example, the authentication server 164 can send an encrypted message 546 to the UE 110 with a payload that is encrypted using the cipher key Kc 426. The UE 110 can decrypt the encrypted message 546 using the cipher key Kc' 446 to obtain a payload of the encrypted message 546. Similarly, the UE 110 can send an encrypted message 546 to the authentication server 164 with a payload that is encrypted using the cipher key Kc' 446. The authentication server 164 can decrypt the encrypted message 546 using the cipher key Kc 426 to obtain the payload of the encrypted message 546. In this manner, secure communications are established between the UE 110 and the core network 190.

Example Method

Figure 6:
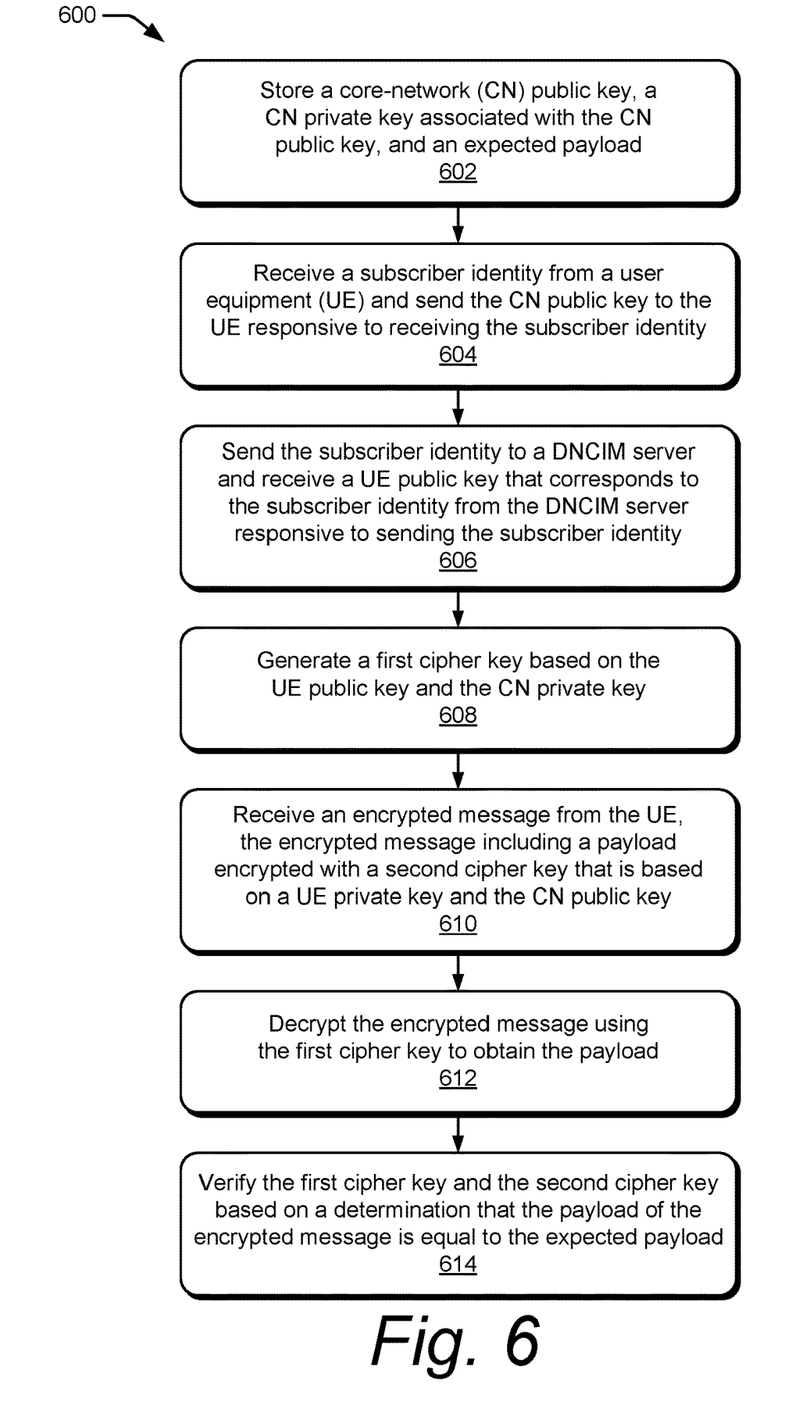
FIG. 6 illustrates an example method for distributed network cellular identity management.

FIG. 6 depicts an example method 600 for distributed network cellular identity management. Method 600 is shown as a set of operations (or acts) performed but not necessarily limited to the order or combinations in which the operations are illustrated. Further, any of one or more of the operations may be repeated, combined, reorganized, or linked to provide a wide array of additional and/or alternate methods. In portions of the following discussion, reference may be made to environment 100 of FIG. 1 and entities detailed in FIGS. 2-4, reference to which is made for example only. The techniques are not limited to performance by one entity or multiple entities operating on one device.

At 602 a CN public key, a CN private key associated with the CN public key, and an expected payload are stored. For example, the authentication server 164 stores the CN public key 214, the CN private key 212, and the expected payload 220, as shown in FIG. 2. The CN private key 212 and the CN public key 214 represent a pair of cryptographic keys that are mathematically linked. The expected payload 220 can include the CN public key 214, a nonce, or a predetermined number. The CN private key 212, the CN public key 214, and the expected payload 220 can be individually provided to the authentication server 164 at different times. In some cases, the expected payload 220 can be determined by the authentication server 164 at a later time (e.g., after 604, after 606, or prior to 612). The authentication server 164 can be implemented as the HSS server for 4G standards or can include the AUSF or the UDM module for 5G standards.

At 604 a UE public key associated with a UE is received. For example, the authentication server 164 receives the UE public key 210 associated with the UE 110. The UE public key 210 can be received from the UE 110 or the DNCIM server 166. If the authentication server 164 receives the subscriber identity 216 from the UE 110, as shown in FIG. 4 at 405, the authentication server 164 can send the subscriber identity 216 to the DNCIM server 166, as shown in FIG. 4 at 410, to request that the DNCIM server 166 sends the UE public key 210 that corresponds to the subscriber identity 216. The authentication server 164 can also send the CN public key 214 to the UE 110. In some aspects, the authentication server 164 sends the CN public key 214 to the UE 110 using an encrypted message 436, as shown in FIG. 4 at 435. At 606, a first cipher key is generated based on the UE public key and the CN public key. For example, the authentication server 164 can generate the cipher key Kc 426 based on the UE public key 210 and the CN private key 212, as shown in FIG. 4 at 425.

At 608, an encrypted message is received from the UE. The encrypted message includes a payload encrypted with a second cipher key that is based on a UE private key and the CN public key. For example, the authentication server 164 receives the encrypted message 456 from the UE 110, as shown in FIG. 4 at 455. The encrypted message 456 includes a payload encrypted with the cipher key Kc' 446, which is based on the UE private key 208 and the CN public key 214. The payload can include the CN public key 214, a nonce, or some predetermined number.

At 610, the encrypted message is decrypted using the first cipher key to obtain the payload. For example, the authentication server 164 decrypts the encrypted message 456 to obtain the payload. The decryption can be performed as part of the key agreement function at 460 of FIG. 4.

At 612, the first cipher key and the second cipher key are verified based on a determination that the payload of the encrypted message is equal to the expected payload. For example, the authentication server 164 verifies the cipher key Kc 426 and the cipher key Kc' 446 based on a determination that the payload of the encrypted message 456 is equal to the expected payload 220. This determination can be performed as part of the key agreement function at 460 of FIG. 4.

CONCLUSION

Although techniques for distributed network cellular identity management have been described in language specific to features and/or methods, it is to be understood that the subject of the appended claims is not necessarily limited to the specific features or methods described. Rather, the specific features and methods are disclosed as example implementations of distributed network cellular identity management.

The invention claimed is:

1. A method performed by an authentication server, the method comprising:
    receiving a first subscriber identity from a user equipment;
    storing a core-network public key, a core-network private key associated with the core-network public key, and an expected payload;
    in response to sending the first subscriber identity to a distributed-network cellular-identity management, DNCIM, server, receiving a user-equipment public key associated with the user equipment;
    generating a first cipher key based on both the user-equipment public key and the core-network private key;
    in response to sending, to the user equipment, a message encrypted using the user-equipment public key and including the core-network public key, receiving a first encrypted message from the user equipment, the first encrypted message including a first payload encrypted with a second cipher key that is based on a user-equipment private key and the core-network public key;
    decrypting the first encrypted message using the first cipher key to obtain the first payload; and
    upon verifying the first cipher key and the second cipher key based on a determination that the first payload of the first encrypted message is equal to the expected payload, authenticating the user equipment based on communicating with the DNCIM server.

2. The method of claim 1, further comprising:
    responsive to the authenticating the user equipment, sending, to the user equipment, a second encrypted message including a second payload that is encrypted with the first cipher key, the second encrypted message being decryptable using the second cipher key.

3. The method of claim 1, further comprising:
    receiving a third encrypted message from the user equipment, the third encrypted message including a third payload encrypted with the second cipher key; and
    responsive to authenticating the user equipment, decrypting the third encrypted message using the first cipher key to determine the third payload.

4. The method of claim 1, wherein:
    the message encrypted using the user-equipment public key further includes a nonce and the expected payload comprises the nonce; or
    the message encrypted using the user-equipment public key further includes a predetermined number and the expected payload comprises the predetermined number.

5. The method of claim 1, wherein the authenticating the user equipment comprises:
    sending the user-equipment public key to DNCIM server;
    receiving a second subscriber identity from the DNCIM server; and
    determining the user equipment is authentic based on matching the first subscriber identity with the second subscriber identity.

6. An authentication server configured to:
    receive a first subscriber identity from a user equipment;
    store a core-network public key, a core-network private key associated with the core-network public key, and an expected payload;
    in response to sending the first subscriber identity to a distributed network cellular identity management, DNCIM, server, receive a user-equipment public key associated with the user equipment;
    generate a first cipher key based on both the user-equipment public key and the core-network private key;
    in response to sending, to the user equipment, a message encrypted using the user-equipment public key and including the core-network public key, receive a first encrypted message from the user equipment, the first encrypted message including a first payload encrypted with a second cipher key that is based on a user-equipment private key and the core-network public key;
    decrypt the first encrypted message using the first cipher key to obtain the first payload;
    upon verifying the first cipher key and the second cipher key based on a determination that the first payload of the first encrypted message is equal to the expected payload, and authenticate the user equipment based on communicating with the DNCIM server.

7. The authentication server of claim 6, further configured to:
    send a second encrypted message to the user equipment responsive to authenticating the user equipment, the second encrypted message including a second payload that is encrypted with the first cipher key and is decryptable using the second cipher key.

8. The authentication server of claim 6, further configured to:
    receive a third encrypted message from the user equipment, the third encrypted message including a third payload encrypted with the second cipher key; and
    responsive to authenticating the user equipment, decrypt the third encrypted message using the first cipher key to determine the third payload.

9. The authentication server of claim 6, further configured to:
    the message encrypted using the user-equipment public key further includes a nonce and the expected payload comprises the nonce; or
    the message encrypted using the user-equipment public key further payload includes a predetermined number and the expected payload comprises the predetermined number.

* * * * *